United States Patent Office 2,703,791
Patented Mar. 8, 1955

2,703,791

VINYL CHLORIDE POLYMERS PLASTICIZED WITH POLYCARBOXYLATES

John M. Butler, Dayton, Ohio, assignor to Monsanto Chemical Company, St. Louis, Mo., a corporation of Delaware No Drawing. Original application February 15, 1950, Serial No. 144,383, now Patent No. 2,687,421, dated August 24, 1954. Divided and this application December 24, 1953, Serial No. 400,351

4 Claims. (Cl. 260—31.8)

This invention relates to new condensation products formed by reaction of $\alpha,\beta$-unsaturated, dicarboxylic acid derivatives with olefinic fatty acids. More particularly, it relates to new condensation products formed by reaction of certain fumarates with mono-olefinic fatty acids, of from 10 to 24 carbon atoms or esters of such fatty acids, and to methods of producing the same. The invention more particularly relates to plasticized vinyl chloride polymers containing the new products.

The reaction of certain $\alpha,\beta$-unsaturated acid derivatives with olefinic fatty acids or their esters is well-known in the art. Numerous examples in the literature show the formation of adducts from maleic anhydride and mono-olefinic fatty acids such as undecylenic and oleic acid and their lower alkyl esters. Although it is generally stated that maleic acid, fumaric acid and the alkyl esters of maleic or fumaric acid may be substituted for maleic anhydride to give equivalent results, very few experiments have been reported to support these several assumptions. Thus, while the Clocker patent, U. S. No. 2,188,882, shows the use of a maleic half-ester in Example 6, the meager description of the resulting reaction product is insufficient for either a comparison of the reaction product with that obtained from maleic anhydride or for a comparison of the respective reactivities of the two dicarboxy components. Also no showing is made concerning participation of the diesters of maleic and fumaric acids in the reaction generally embraced by the Clocker patent, the inference being that these esters, as well as the half-ester, are equivalents of maleic anhydride in the formation of adducts.

Other investigators (H. Plimmer, Journal of the Oil and Colour Chemists' Association, 32 104 (1949); British Patent No. 500,348 to Pinchin, Johnson & Co. Ltd., E. A. Bevan and J. R. Tervet (1939)) state that different results are observed according to whether maleic anhydride itself, maleic esters or salts of maleic acid are employed. Thus, whereas the reaction of maleic anhydride or maleic acid with linseed oil results in viscous products, the reaction of mono- or dibutyl maleates with linseed oil under similar conditions results in only a very small increase in viscosity, although the addition reaction appears to be complete. This may indicate that besides the primary addition reaction, polymerization or cross-linking reactions participated in by anhydride groups are responsible for the high viscosity of the maleic anhydride-fatty acid reaction products.

Because of the industrial importance of maleic anhydride-fatty acid addition products, considerably detailed studies (Ross, Gebhart and Gerecht, J. Amer. Chem. Soc. 68, 1373 (1946); Bickford, Krauczumas and Wheeler, Oil and Soap 19, 23 (1942); Bickford, Fisher, Kyame and Swift, J. Amer. Oil Chemists' Assoc. 25, 254 (1948)) have been made concerning the nature of such adducts and it has been generally concluded that while the mono-olefinic fatty acids or their esters, e. g., methyl oleate, react with maleic anhydride to yield 1:1 addition products, diolefinic fatty acids or their esters react with maleic anhydride to give products in which the ratio of anhydride to acid was considerably in excess of that required for 1:1 adducts, e. g., methyl linoleate and maleic anhydride yield condensation products in which two or more moles of maleic anhydride have reacted with one mole of the ester. The formation of such products has been explained by first, a 1:4-addition of the maleic anhydride and then a secondary reaction of the primary adduct with an additional mole of maleic anhydride by addition at the remaining olefinic linkage and displacement of the double bond to yield a di-substituted, mono-unsaturated adduct. Accordingly, the formation of adducts containing more than one mole of maleic anhydride per mole of fatty acid has been believed to be a function of the number of double bonds present in the fatty acid component of the original reaction mixture.

Summarizing, prior art teachings concerning reactions involving $\alpha,\beta$-unsaturated dicarboxylic acid derivatives and olefinic fatty acids indicate that 1. Maleic anhydride, maleates and fumarates are equivalents in the reaction, but that
2. Esters give less viscous products than does maleic anhydride when reacted with olefinic fatty acids, and that
3. In order to obtain good yields of adducts of high maleic acid content, the fatty acid component should have more than one double bond.

The above beliefs concerning the preparation of $\alpha,\beta$-mono-olefinic dicarboxylic adducts with unsaturated fatty acids has materially affected the potential usefulness of such adducts; for, while the adducts were granted to have an interesting structure with respect to potential chemical reactivity, in practice it has been difficult to prepare products of uniformly good physical attributes. Stemming from the knowledge that the maleates were not so reactive as maleic anhydride, the latter has been preferred almost exclusively as the dicarboxy component in reactions of this type. However, adducts from maleic anhydride have been generally of very poor color. For example, the color of adducts of maleic anhydride and a fatty acid such as oleic acid generally varies from dark brown to black, even though the starting materials are colorless. Again, while adducts of high maleic to fatty acid ratio appeared to be of potential usefulness because they are unsaturated and have a long alkyl chain and many carboxy groups, the seeming necessity of employing only the readily oxidizable and polymerizable dienic fatty acids for the preparation of the high maleic ratio materials presented obstacles of industrial control. Moreover, the fact that addition of maleic anhydride to dienic fatty acids proceeds through a one-four type of addition with formation of compounds having cyclic substituents prevented use of the diolefinic fatty acids for the preparation of purely aliphatic products.

Now, I have found that, contrary to prior art teachings, esters of $\alpha,\beta$-mono-olefinic dicarboxylic acids are neither general equivalents of maleic anhydride nor generally less reactive then maleic anhydride in reactions with olefinic fatty acids, and that adducts of greater than 1:1 dicarboxy to fatty acid ratios are obtainable in good yields from mono-olefinic fatty acids when alkyl esters of fumaric acid are used as the dicarboxy components, the formation of such adducts proceeding as follows:

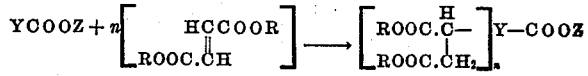

wherein Y is an aliphatic, mono-olefinic hydrocarbon residue of from 9 to 23 carbon atoms, R is an alkyl group of from 1 to 8 carbon atoms, Z is a member of the group consisting of R and hydrogen, and $n$ is an integer of from 1 to 4.

When alkyl fumarates, instead of maleic anhydride or the corresponding maleates, are reacted with the fatty acids, the reaction proceeds much more smoothly than it does with maleic anhydride and much more rapidly that it does with the maleates. The physical and chemical characteristics of the fumarate-fatty acid adducts differ remarkably from those of the maleic anhydride adducts. Whereas the latter are generally opaque and of a dark brown color, the fumarate adducts are clear and colorless, or slightly yellow. Also, while the use of maleic anhydride or the maleate leads only to the formation of 1:1 adducts, when the alkyl fumarates are employed as the dicarboxy components there are formed not only the 1;1 adducts but also adducts having up to 4 moles of the dicarboxy compound per mole of fatty acid, the primarily formed 1:1 adducts being rapidly converted to adducts of the higher dicarboxy content as the reaction is allowed to proceed during the reaction times generally used for the preparation of maleic anhydride-fatty acid adducts. I have also found that both the 1:1 fumarate adducts and the adducts of higher fumarate content possess good plasticizing properties when employed in compositions comprising polyvinyl chloride polymers. The higher ratio adducts, i. e., adducts having the general formula:

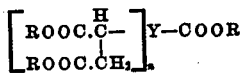

wherein Y and R are as defined above and $n$ is an integer of from 2 to 4, are especially useful.

In preparing my new fumarate-fatty acid adducts, I prefer to employ di-esters of fumaric acid with aliphatic, un-substituted alcohols of from 1 to 8 carbon atoms, these esters yielding adducts which I find particularly useful as plasticizers. As examples of fumarates which I employ may be mentioned dimethyl fumarate, diethyl fumarate, di-n-propyl fumarate, di-isobutyl fumarate, di-tert-amyl fumarate and bis(2-ethylhexyl) fumarate. The fatty acid component which I preferably employ is a mono-olefinic, non-hydroxylated fatty acid of from 10 to 24 carbon atoms, or a lower alkyl ester thereof, i. e., an ester of such an acid with an aliphatic, unsubstituted alcohol of from 1 to 8 carbon atoms. As examples of mono-olefinic acids or their esters which I employ may be mentioned undecylenic acid, oleic acid, methyl, ethyl, n-butyl, isoamyl and n-octyl undecylenate, and ethyl, isopropyl, isoamyl, n-hexyl and 2-ethylhexyl oleate. Depending upon the quantity of the high fumarate adducts which I desire in the final product, I use from 1 to 8 moles of the alkyl fumarate per mole of the fatty acid, although I have found that even when a proportion of less than a molar equivalent of the fumarate per mole of the fatty acid component is employed, some of the higher ratio adduct is generally formed. In effecting the reaction I generally prefer to operate as follows:

The fumarate and the fatty acid or ester thereof are mixed in a reaction vessel in the proportions indicated above and the mixture is heated, usually at atmospheric pressures at temperatures of from 150° C. to 300° C. Pressures of below or above atmospheric may be employed. In some instances, especially when working with the higher fatty acid esters, an inert diluent, e. g., hexane or xylene may be desirable. The temperatures employed are preferably those which do not exceed the decomposition point of the initial reactants. The reaction time may vary from, say, a few minutes to 24 hours, a reaction time of, say, from 2 to 8 hours being recommended when it is desired to obtain a preponderant yield of products having a greater than 1:1 ratio of fumarate. The product is generally a viscous liquid which comprises a mixture of adducts of varying dicarboxy content and unreacted initial reagents. Any unreacted material may be readily recovered, e. g., by distillation, and the residue of mixed adducts may be used as such for a variety of industrial purposes or fractionated to remove substantially all of the 1:1 adducts and obtain a viscous liquid which comprises a mixture of the higher adducts, i. e., a mixture of compounds having the general formula:

in which $n$ is an integer of from 2 to 4.

The invention is further illustrated, but not limited, by the following examples:

*Example 1*

A mixture consisting of 124 g. (0.4 mole) of ethyl oleate and 124 g. (ca. 0.7 mole) of freshly distilled diethyl fumarate was slowly brought to a temperature of 228° C. and maintained at a temperature of from 228° C. to 252° C. for a period of 5 hours and 34 minutes. Distillation of the resulting mixture, under reduced pressure, gave the following fractions:

1. 58 g. up to 140° C./26 mm. (220° C. pot temp.). This material was unreacted ethyl fumarate.
2. 91 g. up to 193° C./3 mm. (260° C. pot temp.). This material was unreacted ethyl oleate.
3. 97 g. of residue, boiling at above 193° C./3 mm., a light amber, slightly viscous oil, $n^{25}_D = 1.4613$.

Based on the quantity of recovered material, fraction 3 is a mixture containing addition products derived from ethyl fumarate and ethyl oleate in ratios of 1:1 and higher. The saponification equivalent of fraction 3 was found to be 140.09 and 140.85 in two determinations (theoretical for 1:1 ethyl fumarate-ethyl oleate adduct, 160.8; for a 2:1 adduct, 130.9). The average molecular weight of fraction 3, as determined by the freezing point method (cyclohexane) was 612 (molecular weight of a 1:1 ethyl fumarate adduct, 482; of a 2:1 adduct, 654).

*Example 2*

In this example, an attempt was made to obtain a 1:1 addition product by employing a higher ratio of ethyl oleate-diethyl fumarate ratio than that used in Example 1.

A mixture consisting of 114 g. (0.66 mole) of diethyl fumarate and 230 g. (0.74 mole) of ethyl oleate was brought to a temperature of 257° C. within a period of 45 minutes and maintained at approximately that temperature for an additional time of 3 hours and 25 minutes. Vacuum distillation of the reaction product gave the following fractions:

1. 36 g. up to 150° C./25 mm. head temp. (260° C./25 mm., pot temp.).
2. 195 g. up to 210° C./3 mm. head temp. (265° C./3 mm., pot temp.).
3. Residue, B. P. over fraction 2.

52 g. of the residue (3) were subjected to distillation at a pressure of 2.5 mm. Hg. There was thus obtained:

I. 31 g. of a fluid, odorless, light yellow distillate, B. P. 230 to 295° C./2.5 mm., saponification equivalent, found 146.43; calcd. for a 1:1 diethyl fumarate-ethyl oleate adduct, 160.8. This fraction is a mixture of 1:1 and 2:1 diethyl fumarate-ethyl oleate adducts.

II. 21.g. of an odorless, quite viscous residue, B. P. over 295° C./2.5 mm., saponification equivalent, found 132.35; calcd. for a 2:1 diethyl fumarate-ethyl oleate adduct, 130.9. Accordingly, this fraction contains a preponderant quantity of the 2:1 adduct, together with small amounts of adducts of higher and lower ratios.

Both I and II have great thermal stability.

Accordingly, the residue (3) obtained above is a mixture of a 1:1 diethyl fumarate-ethyl oleate adduct and diethyl fumarate-ethyl oleate adducts of a ratio of from 2:1 to 4:1, and the higher ratio products are formed even when more than an equimolar proportion of ethyl oleate is employed with the diethyl fumarate in the initial reaction mixture.

In order to compare the reactivity of diethyl fumarate with the corresponding maleate, and to show the difference in the reactivity of the two dicarboxylates, a run was made in which 0.5 mole (86 g.) of diethyl maleate was reacted with 0.4 mole (124 g.) of ethyl oleate and the mixture was heated for 6 hours at a temperature of 200° C. Fractionation of the resulting reaction mixture gave the following products:

| Cut | B. P. °C./1 mm. Hg | Grams | |
|---|---|---|---|
| 1 | 68–72 | 81.0 | |
| 2 | 77–80 | 1.7 | unreacted materials. |
| 3 | 80–130 | 11.1 | |
| 4 | 147–152 | 24.8 | |
| 5 | 152–167 | 84.5 | |
| 6 | 168–200 | 0.5 | adducts and/or polymer. |
| 7 | over 200 | 5.5 | |

The small quantity of reaction product obtained emphasizes the poor reactivity of diethyl maleate.

*Example 3*

In this experiment, reaction was effected by heating together under reflux 62 g. of ethyl oleate and 68.8 g. of diethyl fumarate. Here two molar equivalents of diethyl fumarate were used per mole of the oleate. The mixture was brought to a temperature of 210° C. within 25 minutes and heating was continued for an additional 2 hours and 30 minutes, the temperature being allowed to rise to a maximum of 258° C. during this time. Distillation of the reaction mixture under reduced pressure gave the following materials:

1. 39 g. to 120° C./26 mm.
2. 49 g. to 193° C./4 mm.
3. 43 g. of residue, a light amber liquid.

Viscosity determinations of this liquid gave the following values:

At 100° F.=78.06 centistokes
At 210° F.=9.02 centistokes

The saponification equivalent of the liquid was found to be 143.30. Accordingly, the residue contains products of a higher than 1:1 diethyl fumarate:oleic acid ratio. Although the reaction time employed in this experiment (less than 3 hours) was much less than that employed in Example 1 (almost 6 hours) there was not much difference in the proportionate yield of the high boiling residue.

From the above examples it is obvious that a significant result of reactions effected with diethyl fumarate is the formation of high boiling adducts having greater than a 1:1 diethyl fumarate:ethyl oleate ratio. That this phenomenon cannot be attributed to the formation of polymeric diethyl fumarate was shown by an experiment in which a thermal polymerization of diethyl fumarate was attempted. Here 140 g. of freshly distilled diethyl fumarate was placed in a 300 cc. flask and heating was conducted under reflux, the temperature being allowed to rise to 223° C. within a period of 16 minutes and then maintained at this point for a time of approximately 19 hours. Distillation of the resulting material gave 124.5 g. of material boiling up to 130° C./26 mm. (pot temp. 228° C.), which was unchanged diethyl fumarate and only 14.5 g. of a viscous dark amber residue which did not resemble any of the products obtained from diethyl fumarate and ethyl oleate, either in color, viscosity or saponification equivalent.

It is thus evident that the use of diethyl fumarate in the formation of adducts with ethyl oleate results in the production of unique adducts, and that the formation of these adducts is due to specific and unexpected reactivity of diethyl fumarate in the addition reaction and not to experimental control of such reaction conditions as time, temperature or proportion of initial reactants.

While the above examples show only the use of diethyl fumarate as the fumarate component and ethyl oleate as the fatty acid component, these materials being employed consistently in order to show comparable data, the use of other esters of fumaric acid with aliphatic monohydric alcohols of from 1 to 8 carbon atoms and the use of other mono-olefinic, non-hydroxylated fatty acids of from 10 to 24 carbon atoms, or of the esters of such fatty acids with aliphatic, monohydric alcohols of from 1 to 8 carbon atoms, yields similarly unique reaction products. Thus in the reaction of di-n-butyl fumarate and n-butyl undecylenate, there is obtained a preponderance of a light-colored, clear high boiling viscous adduct of pronounced thermal stability, whereas the product obtained by esterifying with n-butanol an adduct prepared from maleic anhydride and either undecylenic acid or n-butyl undecylenate is a dark brown fluid of poor thermal stability. Similarly, reaction of di-n-octyl fumarate with oleic acid yields a stable, clear, viscous light yellow adduct which differs essentially from the dark brown liquid obtained from the reaction of maleic anhydride and n-octyl oleate and subsequent esterification with n-octanol.

While the main difference in the reactivity of the present fumarates in reactions with the present fatty acids is the formation of unique adducts of greater than 1:1 dicarboxylate:fatty acid ratio, the 1:1 adducts obtainable with the same reactants are also noteworthy in that they differ from prior 1:1 dicarboxylate-fatty acid adducts with respect to color, viscosity and thermal stability. Hence, both the 1:1 and the higher dicarboxylate-fatty acid adducts have an industrial usefulness which far surpasses that of prior adducts. Particularly in the plastics and petroleum industries, in which color, viscosity and thermal stability are important attributes of possible additives, the present products are of considerable interest. The good viscosity characteristics of the present adducts recommend them for use as synthetic lubricants, and the higher ratio adducts are especially suitable for use as plasticizers in the synthetic resin and allied industries.

Adducts of acyclic olefinic acids and long-chained unsaturated acids have been hitherto generally suggested for use as softening agents. I have now found, however, that the present fumarate adducts are of outstanding value as plasticizers, these esters not only serving to soften vinyl chloride polymers, but also to impart simultaneously a high degree of low temperature flexibility, very good temperature stability and great mechanical strength to these polymers. While many of the adducts encompassed by the Clocker patent referred to above are incompatible with polymers and copolymers of vinyl chloride, and do not give continuous, homogeneous compositions therewith, the present fumarate adducts are compatible with vinyl chloride polymers and show no exudation of plasticizer even at plasticizer content of up to 50 per cent. Although the quantity of plasticizer employed depends upon the particular polymer to be plasticized and upon its molecular weight, it is usually found that compositions having from 5 per cent to 50 per cent by weight of plasticizer are satisfactory for general utility. The good flexibility of the plasticized compositions increases with increasing plasticizer concentration.

The present adducts, having the general formula herein shown, are valuable plasticizers for polyvinyl chloride and for copolymers of at least 70 per cent by weight of vinyl chloride and up to 30 per cent by weight of an unsaturated monomer copolymerized therewith, for example vinyl acetate, vinylidene chloride, etc. Of particular importance are the resinous compositions which comprise intimate dispersions of mixtures of condensation products having the general formula:

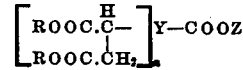

in which $n$ is an integer of from 2 to 4, and a vinyl chloride polymer.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

Employing the above evaluating procedures, tests were made on the material denoted as Fraction 3 of Example 1 (containing a diethyl fumarate-ethyl oleate adduct of greater than 1:1 ratio). 60 parts of polyvinyl chloride and 40 parts by weight of fraction 3 of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 19° C. which value denotes good low temperature properties. Tests on the volatility characteristics of the plasticized composition gave a value of 2.25 per cent which shows very good retention of plasticizer and indicates good high temperature characteristics of the composition. The plasticized material had a hardness of 77 before the volatility test and a hardness of 76 after the volatility test. When subjected to heat at a temperature of 325° F. for a period of 30 minutes the clarity and color of the molded product was substantially unchanged. Tests of the water resistance properties of the plasticized material employing the test procedure described above showed a solids-loss of only 0.08 per cent and an 0.42 per cent water absorption value.

Instead of the adducts employed above other adducts of esters of fumaric acid with aliphatic, monohydric alcohols of from 1 to 8 carbon atoms and mono-olefinic, non-hydroxylated fatty acids or the esters of such fatty acids with aliphatic, monohydric alcohols, give similarly valuable polyvinyl chloride compositions. Thus by employing 40 parts by weight of a high ratio (greater than 1:1) adduct the dimethyl, di-isoamyl, di-n-octyl or mono-tert-butyl fumarate and an alkyl oleate such as isobutyl oleate, with 60 parts by weight of polyvinyl chloride, or with 60 parts by weight of a vinyl chloride-vinyl acetate copolymer, there are obtained clear, colorless compositions of very good flexibility and stability.

While the above shows only a composition in which the ratio of plasticizer to polymer content is 40;60, the content of adduct to polyvinyl chloride may be widely varied, depending upon the properties desired in the final product. For many purposes a plasticizer content of, say, from only 10 per cent to 20 per cent is preferred. The present adducts are compatible with polyvinyl chloride over a wide range of concentrations, up to 50 per cent of adduct based on the total weight of the plasticized composition yielding desirable products.

Although the invention has been described particularly with reference to the use of the present fumarate adducts as plasticizers for polyvinyl chloride these adducts are advantageously employed also as plasticizers for copolymers of vinyl chloride, for example the copolymers of vinyl chloride with vinyl acetate, vinylidene chloride, methyl methacrylate and acrylonitrile. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present fumarate adducts are substantially unreactive with the commercially available heat and light stabilizers which are commonly employed with polyvinyl chloride or copolymers thereof, the presence of such materials in the plasticized materials does not impair the valuable properties of the adducts. The present adducts are of general utility in plasticizing vinyl chloride polymers. They may be used as the only plasticizing component in a compounded vinyl chloride polymer or they may be used in conjunction with other plasticizers.

This application is a division of my copending application Serial No. 144,383 filed February 15, 1950, now Patent 2,687,421.

What I claim is:

1. A resinous composition comprising a vinyl chloride polymer plasticized with a condensation product having the formula

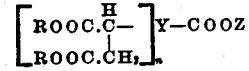

in which Y is an aliphatic, mono-olefinic hydrocarbon residue of from 9 to 23 carbon atoms, R is an alkyl group of from 1 to 8 carbon atoms, Z is a member of the group consisting of hydrogen and R, and $n$ is an integer of from 2 to 4.

2. A resinous composition comprising polyvinyl chloride plasticized with a condensation product having the formula

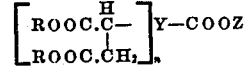

in which Y is an aliphatic, mono-olefinic hydrocarbon residue of from 9 to 23 carbon atoms, R is an alkyl group of from 1 to 8 carbon atoms, Z is a member of the group consisting of hydrogen and R, and $n$ is an integer of from 2 to 4.

3. A resinous composition comprising a copolymer of at least 70 per cent by weight of vinyl chloride and up to 30 per cent by weight of an unsaturated monomer copolymerizable therewith, said copolymer being plasticized with a condensation product having the formula

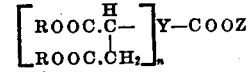

in which Y is an aliphatic, mono-olefinic hydrocarbon residue of from 9 to 23 carbon atoms, R is an alkyl group of from 1 to 8 carbon atoms, Z is a member of the group consisting of hydrogen and R, and $n$ is an integer of from 2 to 4.

4. A resinous composition comprising polyvinyl chloride plasticized with a condensation product having the formula

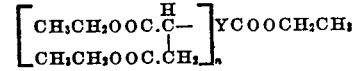

in which Y is an aliphatic, mono-olefinic hydrocarbon residue of from 9 to 23 carbon atoms and $n$ is an integer of 2 to 4.

No references cited.